US011585823B2

(12) United States Patent
Yao (10) Patent No.: US 11,585,823 B2
(45) Date of Patent: Feb. 21, 2023

(54) MAGNETIC PUCK FOR TRANSPORTING SAMPLE CONTAINERS IN A CLINICAL CHEMISTRY ANALYZER SYSTEM

(71) Applicant: Siemens Healthcare Diagnostics Inc., Tarrytown, NY (US)

(72) Inventor: Simin Yao, Boonton Township, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 17/620,458

(22) PCT Filed: Jun. 24, 2020

(86) PCT No.: PCT/US2020/039325
§ 371 (c)(1),
(2) Date: Dec. 17, 2021

(87) PCT Pub. No.: WO2020/263951
PCT Pub. Date: Dec. 30, 2020

(65) Prior Publication Data
US 2022/0244282 A1    Aug. 4, 2022

Related U.S. Application Data (60) Provisional application No. 62/866,871, filed on Jun. 26, 2019.

(51) Int. Cl.
*G01N 35/02* (2006.01)
*B01L 3/00* (2006.01)
(Continued)

(52) U.S. Cl.
CPC .............. *G01N 35/026* (2013.01); *B01L 3/50* (2013.01); *B01L 9/06* (2013.01); *G01N 2035/0406* (2013.01); *G01N 2035/0477* (2013.01)

(58) Field of Classification Search
CPC ......... G01N 35/026; G01N 2035/0406; G01N 2035/0477; B01L 3/50; B01L 9/06
See application file for complete search history.

(56) References Cited

U.S. PATENT DOCUMENTS 5,224,585 A * 7/1993 Blanco ............. G01N 35/00732
198/690.1
5,266,273 A * 11/1993 Coombs ................ B01F 29/322
422/258

(Continued)

FOREIGN PATENT DOCUMENTS

JP        S57 144062 U      9/1982
WO      2015/126839 A1     8/2015

OTHER PUBLICATIONS

PCT International Search Report and Written Opinion dated Oct. 6, 2020 (8 Pages).

(Continued)

*Primary Examiner* — Benjamin R Whatley (57) ABSTRACT

A system for transporting a sample in a clinical analysis system includes a sample container holding the sample, a ferromagnetic base connected to a bottom portion of the sample container, and a puck. The puck is used for transporting the sample container in the clinical analysis system. The puck comprises an embedded magnet for securing the sample container to the puck using the ferromagnetic base.

6 Claims, 6 Drawing Sheets

(51) Int. Cl.
*B01L 9/06* (2006.01)
*G01N 35/04* (2006.01)

(56) References Cited

U.S. PATENT DOCUMENTS

| | | |
|---|---|---|
| 2008/0307117 A1 | 12/2008 | Muller-Cohn et al. |
| 2013/0125675 A1 | 5/2013 | Muller et al. |
| 2013/0126302 A1 | 5/2013 | Johns et al. |
| 2014/0234978 A1* | 8/2014 | Heise .................... G01N 35/04 422/65 |
| 2014/0358036 A1 | 12/2014 | Holmes |
| 2014/0373747 A1* | 12/2014 | Yagci ....................... B61C 3/02 320/108 |
| 2015/0122614 A1 | 5/2015 | Dumitrescu |
| 2016/0077015 A1* | 3/2016 | Holmes ................. G01N 33/50 506/9 |
| 2017/0045545 A1* | 2/2017 | Pollack ............ G01N 35/00871 |
| 2017/0191914 A1* | 7/2017 | Liu .................... C12N 15/1013 |
| 2018/0252737 A1 | 9/2018 | Gemperle et al. |
| 2019/0234977 A1* | 8/2019 | Antinjuntti ............ G01N 35/02 |

OTHER PUBLICATIONS

Extended EP Search Report dated Jul. 12, 2022 of corresponding European Application No. 20831833.7, 10 Pages.

* cited by examiner

Fig. 3B

MAGNETIC PUCK FOR TRANSPORTING SAMPLE CONTAINERS IN A CLINICAL CHEMISTRY ANALYZER SYSTEM

CROSS-REFERENCE TO RELATED APPLICATIONS

This application claims priority to U.S. Provisional Patent Application No. 62/866,871, filed Jun. 26, 2019, the contents of which is incorporated herein by reference in its entirety.

TECHNICAL FIELD

The present invention relates in general to a laboratory automation system and, more particularly, to systems and methods for transporting patient samples using a permanent magnet to hold test tube on moving puck in a clinical chemistry analyzer system.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers onto which sample containers, such as tubes or vials containing patient samples have been loaded. The analyzer extracts a liquid sample from the sample container and combines the sample with various reagents in special reaction cuvettes or tubes (referred to generally as reaction vessels) for testing or processing.

In some systems, a modular approach is used for analyzers. A lab automation system shuttles samples between sample processing modules. Modules may include one or more stations, including sample handling stations and testing stations (e.g., a unit that can specialize in certain types of assays or can otherwise provide testing services to the larger analyzer, which may include immunoassay (IA) and clinical chemistry (CC) stations). Some traditional IVD automation track systems comprise systems that are designed to transport samples from one fully independent module to another standalone module. This allows different types of tests to be specialized in two different stations or allows two redundant stations to be linked to increase the volume of sample throughput available. A track shuttles individual carrier mechanisms, sometimes called pucks between different stations. This track may be, for example, friction-based (similar to a conveyor belt) or use magnetic levitation technology to facilitate movement of the pucks. Samples may be stored in sample containers, such as test tubes that are placed into a puck by an operator or robot arm for transport between stations in an analyzer along the track.

In conventional systems, the puck has a mechanical locking mechanism used to hold the sample container during transport. For example, one popular solution is to use a spring-based apparatus in the puck to apply side spring force which creates friction to hold the sample container. Mechanical locking mechanisms have the drawback that they can quickly deteriorate over time due to normal wear and tear. For example, with a spring-based apparatus, the spring's ability to provide retention force may weaken over time, thereby causing the sample container to not be securely held by the puck during transportation. Accordingly, it is desired to provide a puck that securely holds the sampling container without the drawbacks of a mechanical locking mechanism

SUMMARY

Embodiments of the present invention address and overcome one or more of the above shortcomings and drawbacks, by providing methods, systems, and apparatuses related to magnetic puck for transporting sample containers in a clinical chemistry analyzer system.

According to some embodiments, a system for transporting a sample in a clinical analysis system includes a sample container holding the sample, a ferromagnetic base connected to a bottom portion of the sample container, and a puck. The puck is used for transporting the sample container in the clinical analysis system. The puck comprises an embedded magnet for securing the sample container to the puck using the ferromagnetic base. In some embodiments, the embedded magnet is a permanent magnet. In other embodiments, the embedded magnet is an electromagnet and the puck further compromises a battery for powering the electromagnet. In these embodiments, the puck may further include a potentiometer for adjusting voltage to the electromagnet. The potentiometer may be adjusted, for example, based on a signal received from one or more sensors in the puck or from an external source via a network receiver component in the puck.

According to another aspect of the present invention, a system for transporting a sample in a clinical analysis system includes a track and a puck. The puck is operable to transport a sample container over the track. At least a portion of the sample container is ferromagnetic, and the puck comprises an electromagnet powered by a battery for securing the sample container to the puck. In some embodiments, the system further includes charging station on the track configured to recharge the battery in the puck while the puck is in the charging station. For example, in one embodiment, the puck further comprises a first set of electrical contacts connected to the battery, and the charging station comprises a second set of electrical contacts connected to an electrical power source. The first set of electrical contacts engages the second set of electrical contacts while the puck is in the charging station to recharge the battery in the puck. In other embodiments, the puck further comprises a first magnetic coil, and the charging station comprises a second magnetic coil connected to an electrical power source. The second magnetic coil induces an electrical current in the first magnetic coil via induction while the puck is in the charging station to recharge the battery in the puck.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The present disclosure describes systems and methods related to the use of a magnetic puck for transporting sample containers in a clinical chemistry analyzer system. Briefly, a ferromagnetic base is attached to the sample container and a magnet is embedded in the puck. The magnetic force between the magnet and the ferromagnetic base holds the sample container without a locking mechanism. This design described herein has no moving parts, and provides a holding force in the same direction of loading and unloading forces used by analyzer modules during processing. In contrast to spring-based and other conventional mechanical locking systems, the magnetic locking mechanism described herein does not interfere with the moving path of the sample container during normal operation of the clinical chemistry analyzer system.

Figure 1A:
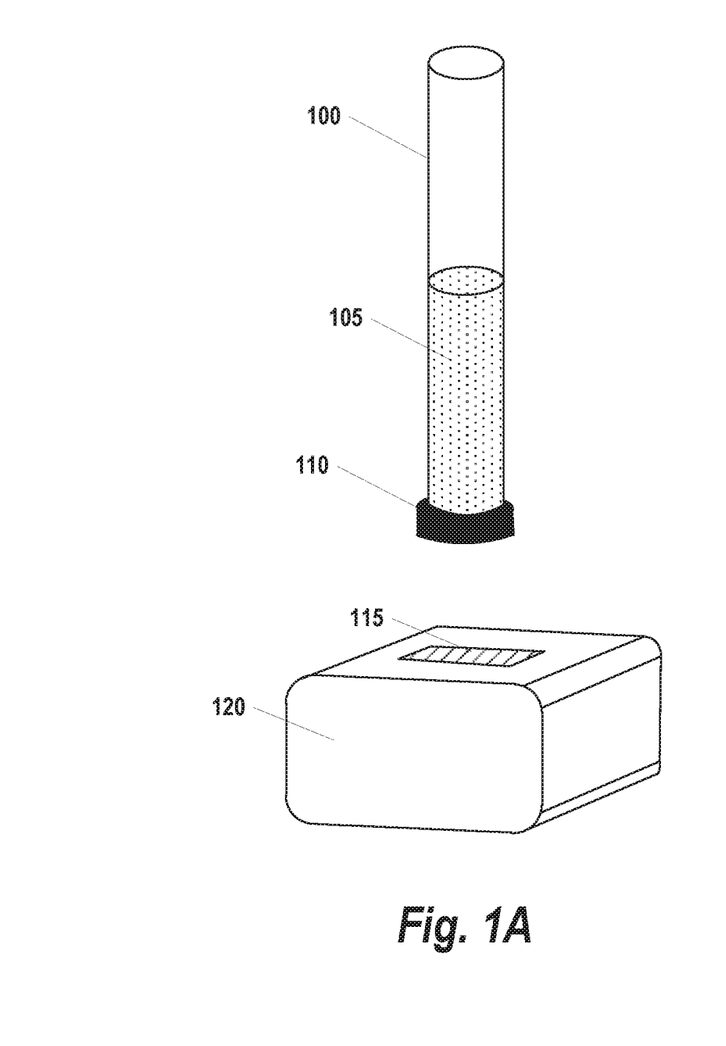
FIG. 1A illustrates the components of a magnetic sample container holder, according to some embodiments
Figure 1B:
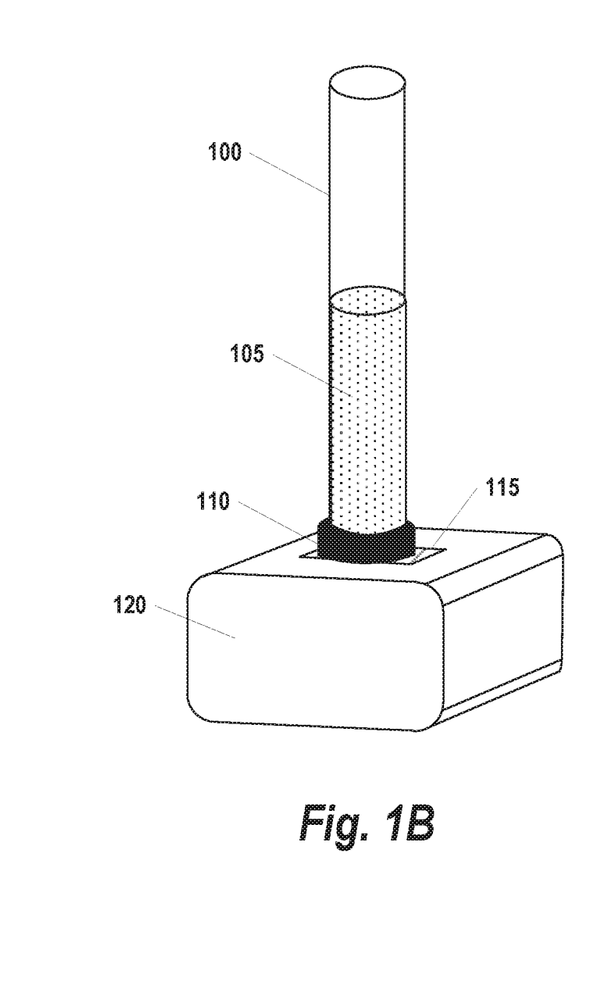
FIG. 1B shows the components illustrate in FIG. 1A as they may be used during transportation of a sample container.

FIGS. 1A and 1B illustrate the basic configuration of a magnetic sample container holder, according to some embodiments. In this example, sample container 100 holds a liquid sample 105. A ferromagnetic base 110 is located at the bottom of the sample container 100. This ferromagnetic base 110 may be constructed, for example out of iron. In some embodiments, the ferromagnetic base 110 is fixed to the bottom of the sample container 100, for example, during manufacturing of the sample container 100. In other embodiments, the ferromagnetic base 110 and the sample container 100 are separate components that may be connected. For example, in one embodiment, a temporary or permanent adhesive may be used to connect the components prior to use. In another embodiment, the bottom of the sample container 100 is threaded and configured to screw into the ferromagnetic base 110.

Continuing with reference to FIGS. 1A and 1B, a magnet 115 is embedded in the top surface of a puck 120. The magnet 115 is positioned within the puck 120 such that the top surface of the puck 120 is flat. As shown in FIG. 1B, the sample container 100 can be attached to the puck 120 by placing the ferromagnetic base 110 over the magnet 115. The magnetic sample container holder depicted in FIGS. 1A and 1B thus provides a simple attachment mechanism with no moving parts. Notably, all that is required to remove the sample container 100 from the puck 120 is providing sufficient vertical upward force to overcome the magnetic force applied by the magnet 115. For example, in the context of IVD, an analyzer module may lock the puck 120 in place as it is received. Then, a robotic arm or other mechanism of the analyzer module may apply an upward force on the sample container 100 to separate it from the puck 120 and allow processing of the liquid sample 105.

Figure 2A:
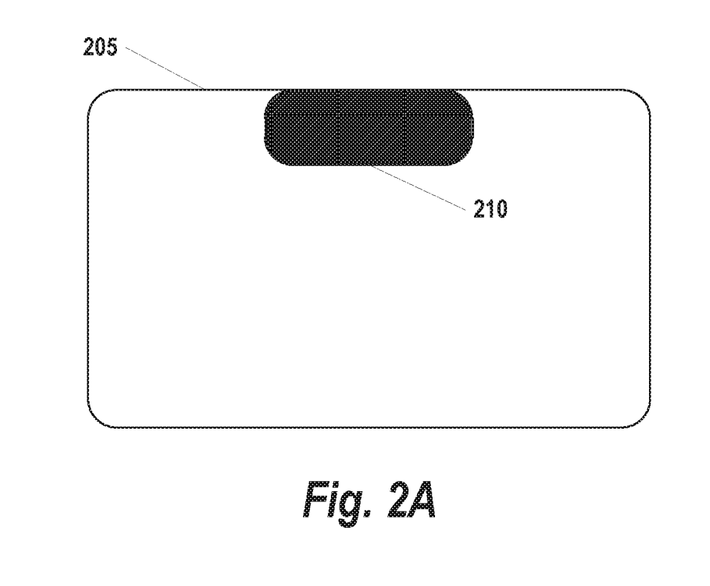
FIG. 2A illustrates an example a magnetic sample container holder where a permanent magnet is placed in the body of a puck.

FIGS. 2A-2D provide example configurations of a puck used with a magnetic sample container holder, according to some embodiments. FIG. 2A provides the simplest example. Here, a permanent magnet 210 is placed in the body of a puck 205. This configuration offers the easiest to implement configuration of the magnetic sample container holder because the permanent magnet 210 does not require any power to operate, and no other parts are required for operation. One drawback of this configuration is that the magnetic force of the permanent magnet 210 is constant and cannot be varied.

Figure 2B:
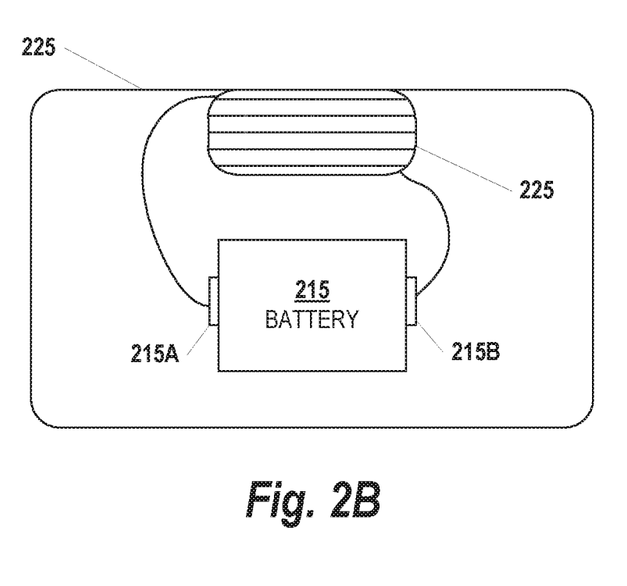
FIG. 2B shows a magnetic sample container holder where an electromagnet is embedded in a puck.

FIG. 2B shows a magnetic sample container holder where an electromagnet 225 is embedded in a puck 220. In this example, coils of wire are wrapped around a metal core to form the electromagnet 225. One end of the wire is connected to a first terminal 215A of a battery 215, while the other end is connected to a second terminal 215B of the battery 215. Thus, as long as the battery remains charged, current will flow throughout the coil and create the magnetic force of the electromagnet 225. The battery 215 in this example is replaceable. For example, the bottom of the puck 220 may include a door that allows access to, and replacing of the battery 215 as needed.

Figure 2C:
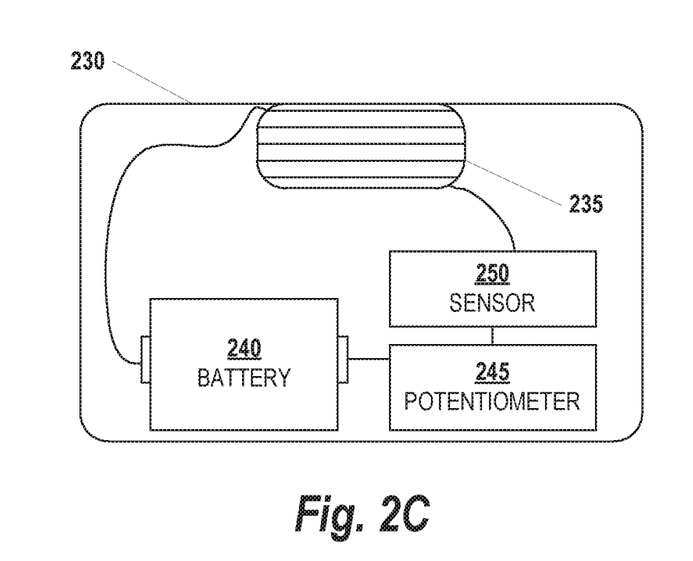
FIG. 2C shows a magnetic sample container holder where a sensor is embedded in the puck.

FIG. 2C provides a variation of the design shown in FIG. 2B. In this example, a sensor 250 is embedded in the puck 230. This sensor 250 provides an input to a potentiometer 245 that, in turn varies the voltage being supplied by the battery 240. By varying the voltage, the strength of the electromagnet 235 in the puck 230 can be varied. Various types of sensors generally known in the art may be used as the sensor 250. For example, in one embodiment, the sensor 250 is an accelerometer and the magnetic force is increased if the accelerometer indicates that the puck 230 is being moved at an angle or at a high rate of speed. Note that, by varying the force in this way, the draw from the battery 240 can be minimized, thereby maximizing the life of the battery 240 (i.e., the time period between recharging or replacing the battery 240). Furthermore, although the example shown in FIG. 2B only includes a single sensor 250, it should be understood that multiple sensors may be used in combination to vary voltage based on several different factors or combinations of factors (e.g., speed, temperature, weight of sample, etc.).

Figure 2D:
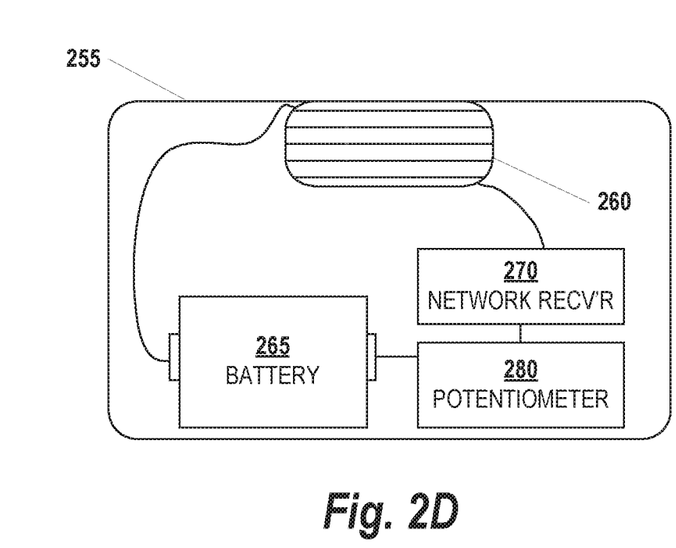
FIG. 2D shows an example where the voltage is varied based on a signal received by a network receiver component.

As an alternative (or supplement to) the use of sensors, FIG. 2D shows an example puck 255 where the voltage is varied based on a signal received by a network receiver component 270. As with the previous example, a potentiometer is used in combination with a battery 240 to vary the magnetic force applied by the electromagnet 235 embedded in the puck 230 surface. In general, the network receiver component 270 can be any device known in the art capable of receiving a signal from an external data source and then producing an output signal to drive the potentiometer 280. For example, in one embodiment, the network receiver component 270 using a networking protocol such as IEEE 802.11 or Bluetooth to receive signals from external computing devices. These signals may specify, for example, a particular current (Amp-turns) or magnetism strength value. As an example in the clinical analysis context, an analyzer module may send a signal to the network receiver component 270 to reduce voltage when the sample container is being removed from the puck 255. In this way, the analyzer module may use less upward force in moving the sample container. In turn, this may reduce movement of the sample in the sample container and ensure that no spills or other actions occur that may compromise the integrity of the sample.

In some embodiments, rather than receiving the signal from an external source, the puck includes a barcode reader or similar scanner than reads symbols on the track surface. For example, consider a track that includes a ramp. A symbol can be place on the track warning the puck that the ramp is approaching. After reading this symbol, the puck may increase the strength of the magnet for the duration of the time it takes to travel along the ramp. Then, at the end of the ramp, another symbol may be placed indicating that voltage can be safely decreased. When this symbol is read by the puck, the potentiometer may be used to reduce the voltage accordingly.

Figure 2E:
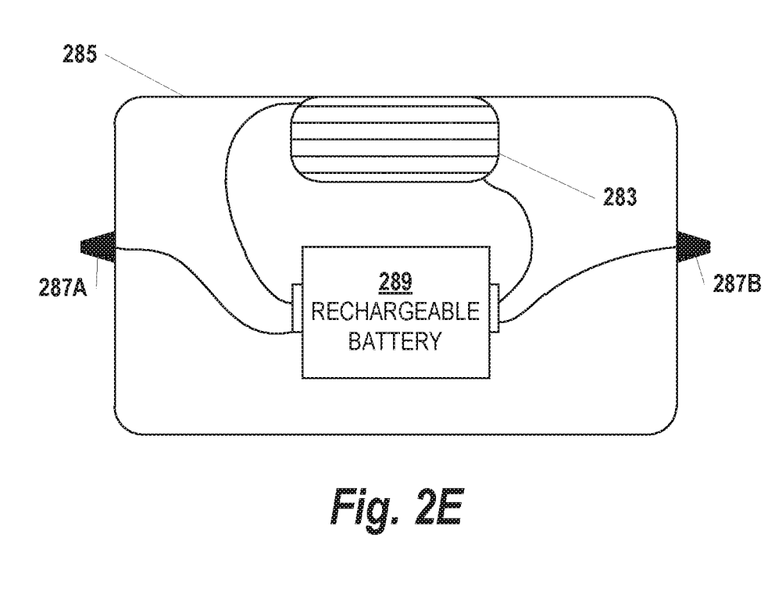
FIG. 2E provides an example puck used with a magnetic sample container holder that includes a rechargeable battery to drive the electromagnet.

FIG. 2E provides an example puck 285 used with a magnetic sample container holder that includes a rechargeable battery 289 to drive the electromagnet 283. In this case, electrical contacts 287A, 287B are placed on the left and right sides of the puck 285, respectively. These electrical contacts 287A, 287B are configured to deliver electricity from an external source to the battery 289 for recharging. It should be noted that the placement of the electrical contacts 287A, 287B is exemplary and different placements may be used in other embodiments. Furthermore, although the puck 285 in FIG. 2E includes two electrical contacts 287A, 287B, other embodiments may use a single electrical contact or more than two electrical contacts.

Figure 3A:
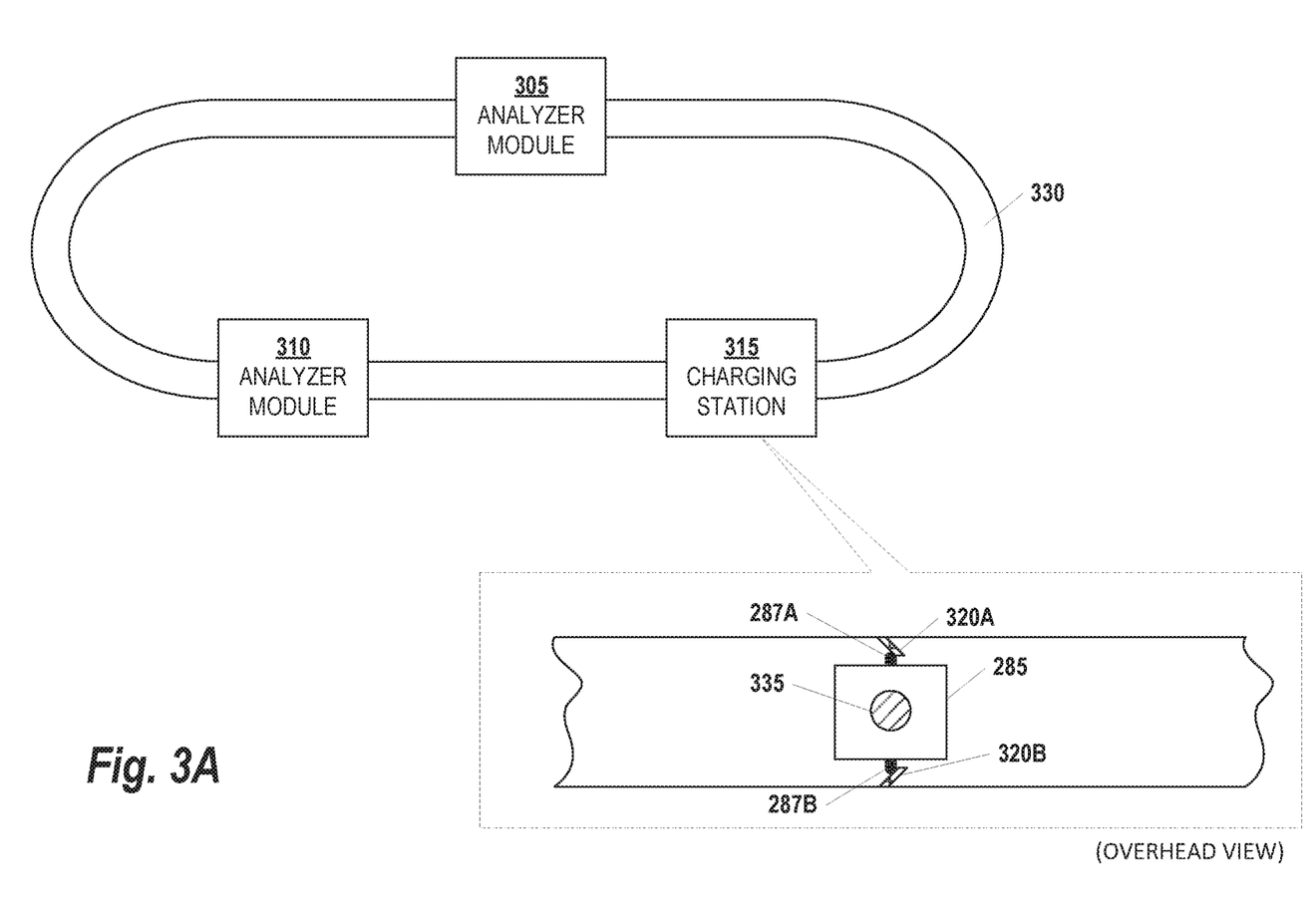
FIG. 3A shows how the puck depicted in FIG. 2E can be charged according to some embodiments.

FIG. 3A shows how these contacts may be used to recharge the rechargeable battery 289 (see FIG. 2E) during use of the puck 285 in an analyzer system. In this example, the puck 285 travels along a track 330 between two analyzer modules 305, 310 that process a sample 335 held on the puck 285. A charging station 315 is placed between the two analyzer modules 305, 310. At the charging station, two charged contacts 320A, 320B protrude from the side of the walls of the track 330. These two charged contacts 320A, 320B are wired to an electrical source (not shown in FIG. 3A). When the puck enters the station, the contacts 287A, 287B on the puck engage the charged contacts 320A, 320B. A conductive connection is created between the puck 285 and the electrical wiring of the charging station 315. This connection allows electricity to pass freely from the electrical wiring of the charging station 315 into puck 285, providing the requisite power for charging the battery of the puck.

Continuing with reference to FIG. 3A, as the puck 285 enters the charging station (or coil active zone, in this zone, the electromagnet is activated) 315, the puck 285 continues to be propelled along the track 330 until it reaches a designated stopping point where the contacts 287A, 287B on the puck engage the charged contacts 320A, 320B. In some embodiments, the charging station 315 is configured to extend and retract the charged contacts 320A, 320B to charge the puck 285 as needed. For example, the charging station 315 may include a sensor (e.g., a motion sensor) that detects entry of the puck into the charging station 315. Upon this detection, the charging station 315 extends the charged contacts 320A, 320B. When the contacts 287A, 287B on the puck engage the charged contacts 320A, 320B, forward movement of the puck 285 is stopped. The charging station 315 may then monitor the charge of the battery in the puck 285 and, when the battery is sufficiently charged, the charged contacts 320A, 320B are retracted, thereby allowing further movement of the puck 285 to the next analyzer module 305. In some embodiments, rather than actively monitoring the battery charge, the charging station may use a timer that charges the puck for a predetermined time before releasing it. It should also be understood that the charging technique described above is exemplary and may be adapted with different components in other embodiments. For example, in some embodiments, the charged contacts 320A, 320B are made of flexible metal that allows passage of puck 285 along the track 330. In this case, the charged contacts 320A, 320B may not retract, but another device (e.g., a small wall extending up from the track surface) may extend from the track to keep the puck 285 in proper charging position as needed.

Figure 2F:
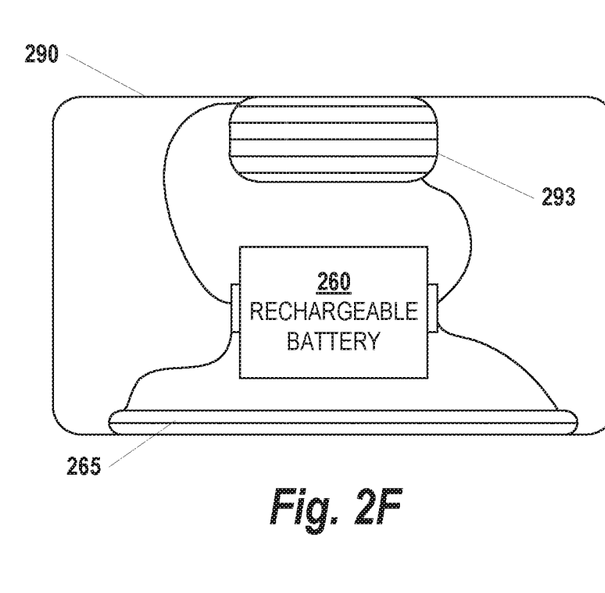
FIG. 2F shows an alternative puck with a rechargeable battery, according to other embodiments.

FIG. 2F shows an alternative puck 290 with a rechargeable battery 260, according to other embodiments. In this case, the puck 290 utilizes induction for charging. As with the previous examples, an electromagnet 293 in the puck in the connected to a rechargeable battery 260. The puck 290 in FIG. 2F further includes a charging coil 265. In some embodiments, the charging coil 265 is embedded within the puck 290. In other embodiments, an apparatus holding the charging coil 265 may be connected to the lower portion of the puck 290. In this case the apparatus can be wired to the rechargeable battery 260 through, for example, a charging port on the puck (not shown in FIG. 2F).

Figure 3B:
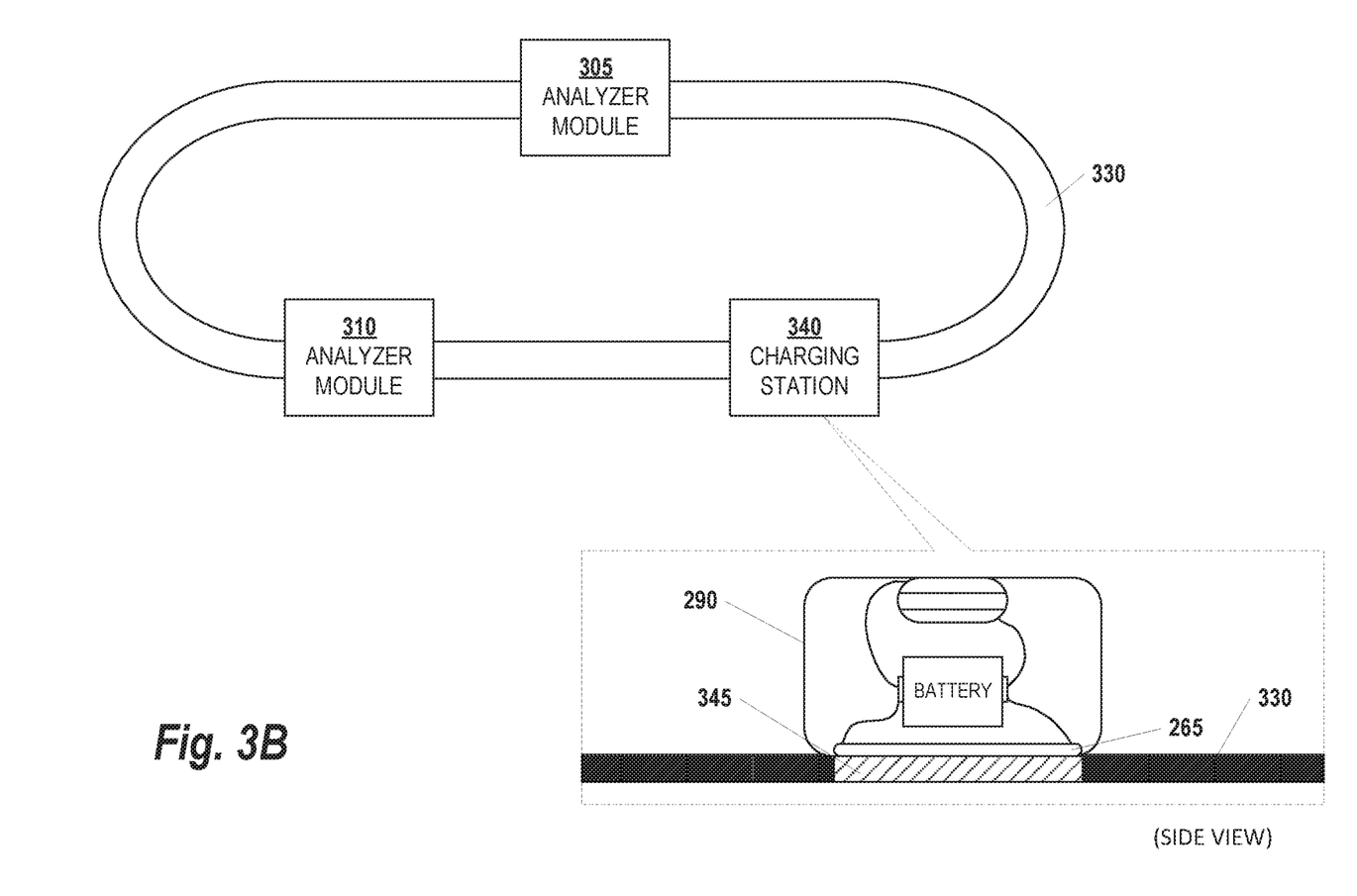
FIG. 3B shows how the puck depicted in FIG. 2F can be charged according to some embodiments.

FIG. 3B shows how the puck depicted in FIG. 2F can be charged according to some embodiments. As with the example of FIG. 3A, a track 330 is used to transport the puck 290 between two analyzer module 305, 310. A charging station 340 is situated on the track 330 to recharge the battery in the puck 290. In this example, the primary charging coil 345 used for charging is embedded in the track 330. This primary charging coil 345 is connected to electrical wiring of the charging station 315 (not shown in FIG. 3B). Energy is transferred from the primary charging coil 345 to the receiver charging coil 265 in the puck 290 using electromagnetic induction. More specifically, the primary charging coil 345 creates an alternating electromagnetic field, which the receiver charging coil 265 in the puck 290 converts back into electricity to be fed into the battery in the puck 290.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

The invention claimed is:

1. A system for transporting a sample in a clinical analysis system, the system comprising:
   a sample container holding the sample;
   a ferromagnetic base connected to a bottom portion of the sample container; and
   a puck operable to transport the sample container in the clinical analysis system, wherein the puck comprises:

an embedded magnet for securing the sample container to the puck using the ferromagnetic base, wherein the embedded magnet is an electromagnet, a battery for powering the electromagnet, and a potentiometer for adjusting voltage to the electromagnet.

2. The system of claim 1, wherein the puck further comprises one or more sensors, and the potentiometer is adjusted based on outputs generated by the one or more sensors.

3. The system of claim 2, wherein the one or more sensors comprise an accelerometer.

4. The system of claim 1, wherein the puck further comprises a network receiver component for receiving a signal from an external source, and the potentiometer is adjusted based on the signal.

5. The system of claim 1, wherein the puck further comprises one or more electrical contacts for receiving power from an external electrical source to recharge the battery.

6. The system of claim 1, wherein the puck further comprises a receiver magnetic coil for recharging the battery via induction by an external magnetic coil.

\* \* \* \* \*